United States Patent [19]
Takeichi et al.

[11] 3,861,621
[45] Jan. 21, 1975

[54] FILM CARTRIDGE FOR MOTION PICTURE PROJECTOR

[75] Inventors: Morio Takeichi, Inazawa; Takashi Ishigaki, Nagoya, both of Japan

[73] Assignee: Elmo Company Limited, Mizuho-ku, Nagoya, Aichi Prefecture, Japan

[22] Filed: Feb. 8, 1973

[21] Appl. No.: 330,652

Related U.S. Application Data
[62] Division of Ser. No. 181,959, Sept. 20, 1971, Pat. No. 3,756,705.

[30] Foreign Application Priority Data
Oct. 2, 1970 Japan.......................... 45-97339[U]
Oct. 2, 1970 Japan.......................... 45-97340[U]

[52] U.S. Cl................ 242/197, 242/71.2, 242/199
[51] Int. Cl...................... G11b 23/10, G11b 15/66
[58] Field of Search ........... 242/199, 198, 197, 200, 242/71.2, 195; 352/72, 78, 157, 158

[56] References Cited
UNITED STATES PATENTS
| | | | |
|---|---|---|---|
| 1,944,023 | 1/1934 | Ford | 242/71.2 X |
| 3,092,346 | 6/1963 | Goodell et al. | 242/197 |
| 3,443,501 | 5/1969 | Domnick | 242/71.2 X |

*Primary Examiner*—George F. Mautz
*Attorney, Agent, or Firm*—Wenderoth, Lind & Ponack

[57] ABSTRACT

A motion-picture projector is adapted for the employment of a film cartridge of such a type as containing a film supply reel with the film trailing end secured thereto, and a take-up core with the film leading end secured thereto, which core is separable from the cartridge housing through a recess built up in one end of the cartridge. The housing is preferably made from two molded half sections, one of which is formed with an opening through which a film rewinding spindle of the projector is engageable with the film supply reel, and the other being provided on the inner surface and at a portion corresponding in position to the opening on one of the half sections with a support for supporting the film supply reel to be held in such a manner that at least a portion of spindle hole of the reel appears in the opening formed on one of two half sections.

The cartridge is initially set in a first position in the projector in which the spindle of the projector engages the supply reel, and then transferred to a second position due to rotation of a reel supporting member of the projector having said spindle mounted thereon. In the second position, the take-up core is gripped by a gripper on a take-up transferring member, so that upon the rotation of the take-up core transferring member the take-up core is transferred with the film leading end to a film winding position.

9 Claims, 13 Drawing Figures

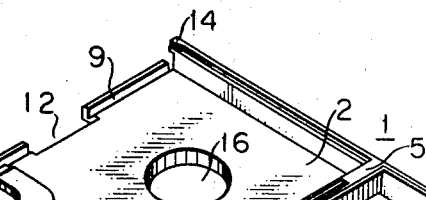

FILM CARTRIDGE FOR MOTION PICTURE PROJECTOR

This is a division, of application Ser. No. 181,959, filed Sept. 20, 1971, now U.S. Pat. No. 3,756,705.

BACKGROUND OF THE INVENTION

This invention relates to motion-picture projectors adapted for the employment of a film cartridge, which contains a film supply reel with the trailing end of a film secured thereto and a film take-up core with the film leading end secured thereto.

Heretofore, in order to simplify operations needed to load a motion-picture projector with a film, and to provide a convenience for the storage of the film, various attempts to employ a cartridge, in which a film to be projected is contained, have been made, and actually some types of motion-picture projectors and cartridges therefor have been commercially provided. However, any one of these conventional cartridges can accept only one film supply reel of the fixed type and hence fixed size. For example, where the cartridge 120 m. in size contains a 15 m. reel, the reel is not held properly in the cartridge because the reel is too small to be contained in the cartridge, resulting in impossibility of the operation of the reel. For the above reason, all the cartridge makers have presented various cartridges in 120 m., 60 m., 30 m., 15 m. sizes for, e.g., 8 mm projection film.

SUMMARY OF THE INVENTION

The present invention provides a film cartridge, which accepts various reels different in film capacity and hence reel diameter from each other, and in which in all cases, the fitting of the cartridge to the projector and the projection of the film in the cartridge can be effected in the same manner. The film cartridge comprises an openable housing made from two molded half sections, one of which is formed with an opening through which a film rewinding spindle of the projector enters a spindle hole of the reel, and the other being provided on the inner surface and at a portion corresponding in position to the opening with a support for supporting the film supply reel so that at least a portion of spindle hole of the supply reel appears in the opening. The support in the form of a cylindrical member is of such minimum dimensions as allowing the film supply reel to be held thereby.

The present invention also provides a device for transferring the abovementioned cartridge from a first position in the projector in which the cartridge is initially fitted to the projector to a second position in the projector in which the film supply reel is held only by the film rewinding spindle. The device comprises a reel supporting member provided at the free end with said spindle for holding said film supply reel and turnable between said two positions. In the first position, the center axis of the spindle is below that of the support and in the second position the same is in alignment with that of the support.

BRIEF DESCRIPTION OF THE DRAWINGS

The objects and advantages of the invention will be more apparent from the following detailed description taken in connection with the accompanying drawings in which:

FIG. 1a is a perspective view of a film cartridge for use with a motion-picture projector according to the present invention, showing particularly the cartridge being closed;

FIG. 1b is a perspective view of the film cartridge of FIG. 1a, but opened;

FIG. 1c is a reduced view substantially corresponding to that of FIG. 1b, when viewed from the opposite direction from that in FIG. 1b;

FIG. 2a is a perspective view of a film take-up core contained in the cartridge;

FIG. 2b is a corresponding plan view of the film take-up core;

FIG. 3 is a perspective view of a film supply reel;

DESCRIPTION OF THE PREFERRED EMBODIMENT

Figure 4A:
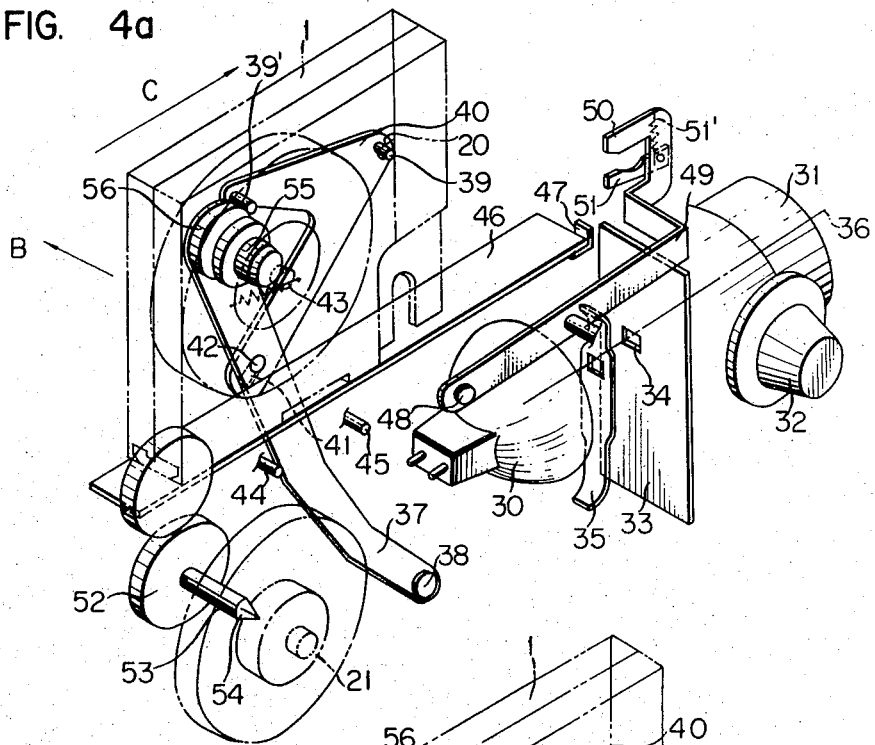
FIGS. 4a and 4b are perspective diagrammatic views illustrating the successive steps of setting the cartridge in place in the projector by using the device according to the invention.

Referring now to FIGS. 1a, 1b and 1c, there is shown an openable film cartridge 1 constructed in accordance with the present invention. The cartridge 1 comprises a housing made from two half sections, i.e., an upper plate element 2 and a lower plate element 3 connected by a hinged portion 5 to the upper plate element, and a movable member 4 serving as a lid of the cartridge. Preferably, the cartridge 1 is molded from a suitable resilient synthetic resin and each of the elements 2, 3 and 5 is an integral part of the cartridge 1. It is noted that the hinged portion 5 is made thinner than the upper and lower plate elements 2, 3 so that these elements 2, 3 are free for a pivotal motion about the hinged portion 5.

Of course, the upper and lower plate elements 2, 3 may be formed separately from the molded plastic. In this case, these elements 2, 3 can be connected together for pivotal motion by a known device such as a hinge.

The movable member 4 in the form of a plate is provided at one end with a notch 6 and an inwardly extending projection or spline 7 near the notch 6, and at the other end with a groove 8 of substantially L-shape for the purpose as hereinafter described. The movable member 4 is slidable in and along grooves 9 and 10 provided respectively in the ends of the plate element 2, 3 remote from the hinged portion 5. The movable member 4 may be pivotally connected to the housing as the case may be. As best shown in FIGS. 1a and 1c, on a part of the same end of the lower plate element 3 as the guide 10, there is integrally provided a wall member 11 of a reverse L-shape which is arranged so that its top, when the cartridge is closed, is engaged in a mating notch 12 formed at the substantially mid portion of the same end of the upper plate element 2 as the guide 9. The wall member 11 is also provided in the lower surface of the top thereof with a groove 13 similar to the afore-said grooves 9 and 10, so that the wall member 11 serves as a guide for the movable member 4. At the opposite corners of the upper plate element 2, there are projections 14 and 15 for guiding and restricting the sliding of the movable member 4, respectively. An opening 16 through which a film rewinding spindle (described hereinafter) of the projector is to be inserted into the cartridge is formed in one of the upper and lower plate elements — in this embodiment, in the upper plate element 2 — and a support 17 is mounted on the inner surface of the other — in this embodiment, in the lower plate element 3 —, which support is engageable in the spindle hole 28 (FIG. 3) of a film supply reel 27 contained in the cartridge to support the reel. The support 17 is of cylindrical shape having such a height and a diameter as sufficient to allow the reel to be held by the support inserted in the spindle hole of the reel. Preferably, the support 17 is made as small as possible. Both of the plate elements 2 and 3 are provided at the corresponding portions with recesses 18 of similar shape, in which the axle of the take-up core with the film leading end secured thereto is held as will be shown hereinafter. Although two recesses 18 are formed in the plate elements 2 and 3 respectively, the holding of the take-up core may be performed using one recess. That is, the other recess may be omitted. As best shown in FIG. 1a, a depression 19 is formed in the outer surface of each of the plate elements 2, 3 so as to surround the associated recess 18, thereby to assist a hereinafter described gripper in engaging with the axle of the take-up core for bringing the latter out of the cartridge and into the film winding position before starting projection. In addition, as best shown in FIG. 1a, the upper plate element 2 is formed with a groove 20 which is arranged at the substantially mid portion of the edge of the outer surface of the upper plate element 2 and serves to have a pin on a hereinafter described arm held therein for transferring the cartridge fitted to the projector to a second predetermined position necessary for projection of the film.

FIGS. 2a and 2b show the take-up core 21 to which the leading end 24 of the film is secured in the manner illustrated. The take-up core 21 is generally of one-piece integral formation and comprises a cylindrical body part, an axle 25 extending from the opposite ends of the body part, and a flexible pillar-like film catcher 23 arranged in a hollow 22 provided in the body part of the take-up core 21. The hollow 22 is of dripping-like shape in cross section with a narrowed opening. The catcher 23 extends upwardly from the bottom (not shown) of the body part while being spaced from the surface wall of the hollow 22 by a distance sufficient to permit the film leading end 24 to be disposed in the space defined by the surface walls of the hollow 22 and the catcher 23 and held against disengagement from the space. As the hollow 22 is provided with the narrowed opening and the catcher 23 is flexible, the film leading end 24 can be firmly secured to the take-up core. Additionally, the axle 25 is formed at the end with a square hole 26 for the purpose as will be hereinafter described.

FIG. 3 shows a hitherto known film supply reel 27 by way of example, which can be employed in the above-mentioned cartridge and is formed with a spindle hole 28 engageable with the film rewinding spindle of the projector, and a securing means in the form of a slit 29 for securing the trailing end of the film to the reel 27.

Figure 4B:
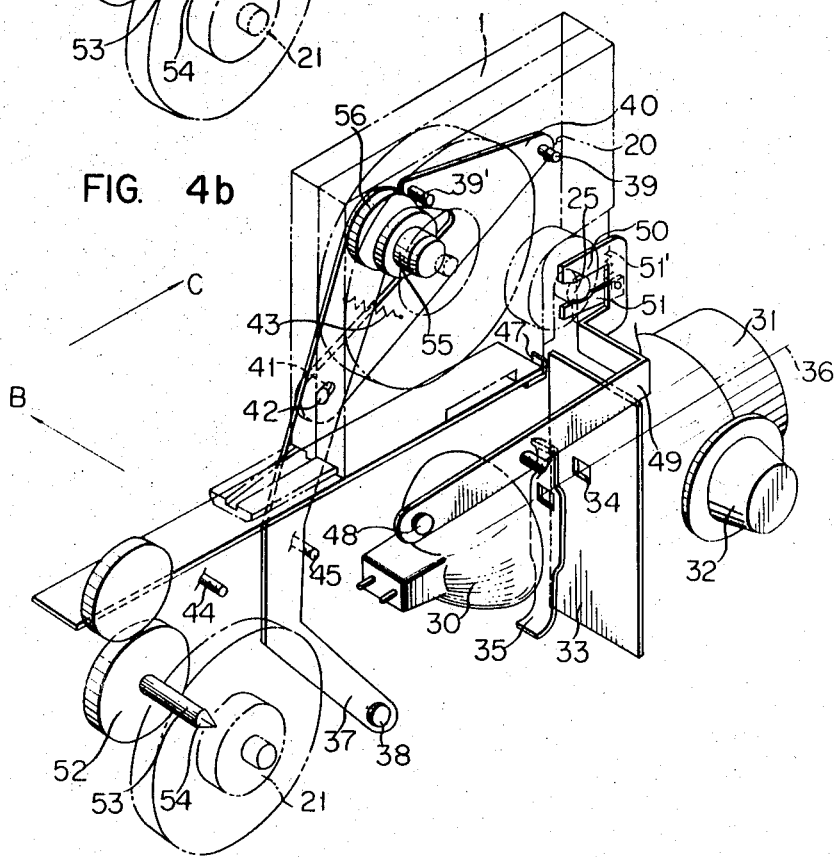

In FIGS. 4a and 4b, the device for setting the aforementioned cartridge 1 in the projection position in the projector is illustrated. Of course, the projector includes, in addition to the above device, a projection lamp 30, a projection lens 31 disposed in front of the lamp 30, a knob 32 for focusing the lens 31, and a film gate disposed between the lamp 30 and the lens 31 and consisting of an aperture plate 33 with an aperture 34 and a pressure plate 35. At least one of the gate members 33 and 35 — in this embodiment, the member 35 — can move along a projection axis 36 in a suitable hitherto known manner to either close or open the film gate.

The above device comprises a reel supporting member 37 (which is hereinafter referred to as a first lever) mounted for pivotal motion about a pin 38 on the projector, the horizontal component of the pivotal motion being parallel to the direction of the projection axis 36, and a hooked arm 40 provided at one end with a pin 39 arranged to engage the groove 20 (see FIG. 1a) of the cartridge 1 and at the other end with an oblong slot 41 which is in loose-engagement with a pin 42 mounted on the first lever 37. The first lever 37 and the arm 40 are connected together by the abovementioned pin and slot assembly and by a resilient member, such as a spring 43, tending to rotate the hooked arm 40 in the counterclockwise direction. Furthermore, the hook of the arm 40 is provided at the extremity with a similar pin 39' which is arranged to abut against the first lever 37, thereby holding a hereinafter described spindle on the first lever 37 in a proper position with respect to the pin 39 such that the cartridge 1 can be fitted to the projector with ease. The pivotal motion of the first lever 37 is limited by pins 44 and 45 and accordingly the cartridge 1 is slidable on a guide plate 46 within the limits defined by the pins 44 and 45 as the first lever 37 is in engagement with the cartridge 1 as will be hereinafter described. A stop projection 47 is mounted on the guide plate 46 or a stationary member of the projector so that after the forward or right-hand end of the cartridge has reached the stop 47, only the movable member 4 of the cartridge 1 is prevented from sliding movement by the stop. As will be apparent, the stop 47 is of such a dimension as allowing the remainder of the cartridge to further slide on the guide member 46 over the stop 47. In FIG. 4b, the cartridge 1 is in the farthest right position or the projection position and the take-up core 21 can be released from the recess 18 of the cartridge and brought outside the cartridge through an opening established in the bottom of the cartridge.

The device further comprises a take-up core transferring member 37 (which is hereinafter referred to as a second lever) pivoted upon a pin 48 and provided at the free end with a gripper consisting of a pair of fingers 50 and 51 biased toward each other by a spring 51', the lower finger 51 being a pivotal or movable member. The second lever 49 is normally arranged such that, when the cartridge comes from the initially fitted position into the aforesaid projection position, the axle 25 of the take-up core 21 is just interposed between the fingers 50 and 51. The second lever 49 may be associated with a suitable driving means (not shown) for turning the second lever 49 to a position in which the axle 25 of the take-up core 21 is engageable with an axle 53 mounted on a rotation transmitting member 52. Since the member 52 is adapted to be driven by another driving means (not shown) or said driving means as the case may be, its rotation can be transmitted through the axle 43, and a pyramidal head 54 thereof engaged in the square hole 26 of the axle 25 to the take-up core 21, whereby the film on the supply reel 27 is wound on the take-up core 21.

Figure 5A:
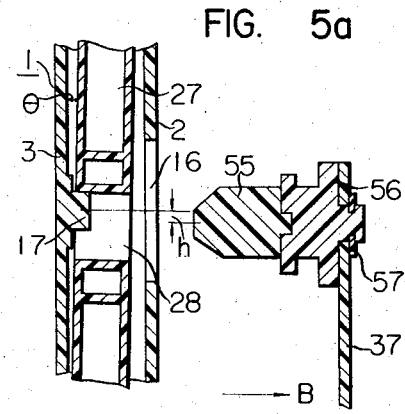
FIGS. 5a, 5b and 5c are fragmental sectional views illustrating the process of an installation of the film cartridge onto a film rewinding spindle of the device according to the invention.
Figure 5B:
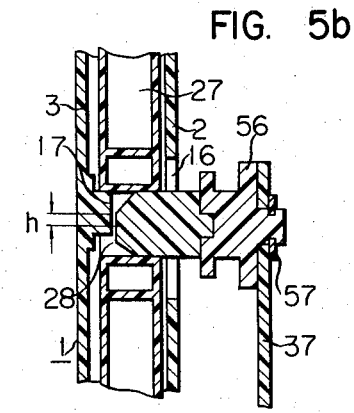
Figure 5C:
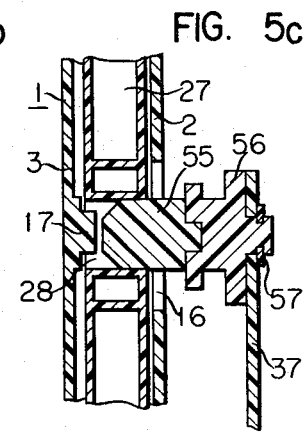

In FIGS. 5b and 5c, the film supply reel 27 contained in the cartridge 1 is carried by the engagement of a spindle 55 mounted on the first lever with the spindle hole 28 of the reel 27. The spindle 55 is fixedly mounted on a pulley 56 which is, in turn, mounted for rotation through an "E" ring 57 to the first lever 37. The spindle 55 is rotated, only when rewinding the film on the take-up cover 21, through the pulley 56 by a suitable power transmitting member (not shown), such as a belt, engaging the pulley 56 and the driving means such as described with respect to the driving of the take-up core 21, and the spindle 55 is free of rotation during projection of the film.

The method of using the cartridge 1 will now be described.

In FIG. 1c, the cartridge 1 is originally in the open condition. The movable member 4 for the cartridge is inserted in a direction A between the groove 10 in the plate element 3 and the groove 13 in the wall member 11 until its projection 7 abuts against the end of the wall member 11 as shown in FIG. 1b. Under the above condition of the cartridge 1, the reel 27 on which the film to be projected is wound with its trailing end secured in the slit 29 and disposed in the lower plate element 3 so that its spindle hole 28 can be fitted onto the support 17. The take-up core 21 having the film leading end 24 secured thereto as shown in FIG. 2b is disposed on the lower plate element 3 so that its axle 25 is engaged in and held by the recess 18 formed in the lower plate element. Thereafter, the cartridge 1 is closed by pivoting the upper plate element 2 about the hinge portion 5 onto the lower plate element 3. At this time, the guide projection 14 on the upper plate element 2 enters the L-shaped groove 8 provided in the movable member 4, so that the projection 14 not only serves as a guide but also does not prevent the sliding motion of the movable member 4. After closing the cartridge 1, the movable member 4 is moved in the opposite direction until its sliding movement is restricted by the engagement of the stop 15 with the notch 6 at the end of the movable member 4, thus placing the cartridge 1 in the completely closed condition as shown in FIG. 1a. In case the cartridge 1 is in such a closed condition, the cartridge 1 can not be opened without sliding the movable member 4 in the direction A because of the engagements of the stop 15 with the notch 6 and of the guide projection 14 with the L-shaped groove 8.

When it is desired to replace the film in the closed cartridge with another film, the movable member 4 is first moved in the direction A until the projection 7 on the movable member 4 abuts against the wall member 11, whereby the cartridge is opened, and then the film supply reel 27 is replaced by another reel on which the next film to be projected is wound.

Then, the cartridge 1 is placed in the projector while in the closed condition shown in FIG. 1a.

The operation of the device for setting the cartridge in the projection position will be described in conjunction with FIGS. 4a, 4b, 5a, 5b, 5c, 6a and 6b.

Figure 6A:
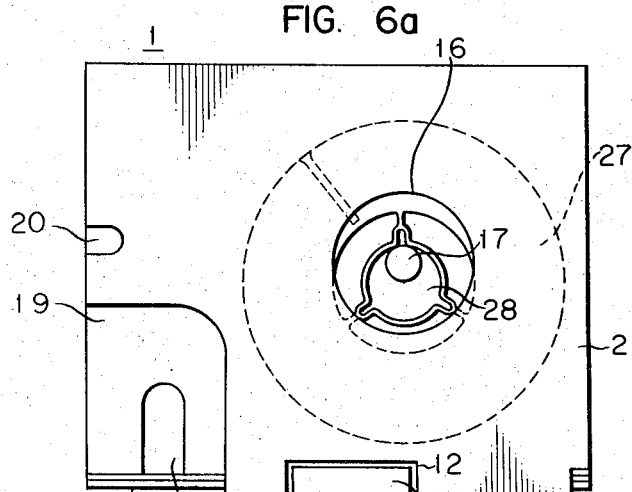
FIGS. 6a and 6b are front elevational views illustrating the process of an installation of the film cartridge onto the film rewinding spindle.

First, the cartridge 1 in the condition shown in FIGS. 5a and 6a is inserted in a direction B into the projector, being placed in the first position on the guide plate 46. In order to facilitate the insertion of the spindle 55 on the first lever 37 into the spindle hole 28 in the reel 27, the tip of the spindle 55 is chamfered at a suitable angle as shown in FIGS. 5a, 5b and 5c and the center axis of the spindle 55 is below that of the support 17 and opening 16 in the first position by an amount h as shown in FIG. 5a. This allows the chamfered tip of the spindle 55 to be shortened and consequently the reel 27 to be held in such a manner as allowing at least a portion of the spindle hole 28 to be located to oppose to the end of the spindle 55. In FIG. 5a, the reel 27 is held by the support 17 at an angle to the cartridge 1. The center of the spindle hole 28 is out of alignment with that of the opening 16 and that of spindle 55. Upon fitting the cartridge 1 to the projector, the cartridge 1 is in a condition shown in FIG. 5b.

In the meantime, the pin 39 on the arm 40 comes in engagement with the groove 20 in the upper plate element 2 of the cartridge. In FIG. 4a, on sliding the cartridge 1 in the direction C along the guide member 46, both the first lever 37 and the arm 40 connected together are turned forwards correspondingly. Thus, the first lever 37 turns about the pin 38 from the first position in which the cartridge 1 is initially fitted to the projector to the second position in which the reel 27 is held only by the spindle 55. In the second position of the first lever 37, the spindle 55 is in aligned relation with respect to the support 17 as shown in FIG. 5c. That is, the center axis of the spindle 55 is in alignment with that of the support 17.

Figure 6B:
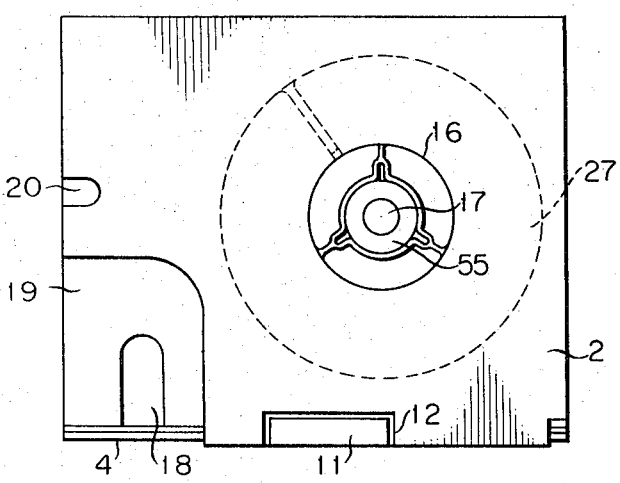

During the sliding movement of the cartridge from the first to the second position, only the movable member 4 stops to slide by means of the stop 47 mounted on the end of the guide member 46. Therefore, upon further movement of the cartridge, there appears the opening on the right-hand side of the bottom of the cartridge 1 so that the take-up core 21 with the film leading end is separable from the cartridge 1 through the recess 18. When the cartridge reaches the second position, the axle 25 of the take-up core 21 projecting out of the housing is gripped by the fingers 50, 51 mounted on the second lever 49 turntable about the pin 48. At this time, the center axis of the spindle 55 is in alignment with that of the support 17 as shown in FIGS. 5c and 6b and therefore the reel 27 is in a most favorable state for its rotation.

Then, the second lever 49 is rotated in the clockwise direction by the suitable driving means along with the take-up core 21, whereby the take-up core 21 with the film leading end passes through the open film gate and the film track (not shown) in the projector and reaches the position in which the take-up core 21 is driven through the rotation transmitting member 52 due to the engagement of the square hole 26 in the take-up core with the complementary axle 53. As described hereinbefore, the member 52 is operated by the suitable driving means.

After threading the film through its predetermined track, the pressure plate 35 is pressed against the film to close the film gate and then the projection of the film on the supply reel 27 starts.

Upon the completion of the projection of the film, the tension in the film increases because the trailing end of the film is fixed to the supply reel slit 29, and this increased tension is utilized to stop the film feeding in a known manner such, for example, that the tension causes a suitable lever to open a switch in an electric circuit of the driving means for the take-up core. Immediately after the stoppage of the film feeding, the spindle 55 commences rotation in a known manner to rewind the film on the reel 27.

After rewinding, the cartridge 1 is moved back to the first position shown in FIG. 4a by operating the related parts in the reverse order of the aforesaid process.

Although the specific embodiment has been described above, it will be readily understood by those skilled in the art that various rearrangements of parts and modifications of parts may be accomplished without departing from the spirit and scope of the invention as defined in the appended claims.

What we claim is:

1. A film cartridge adapted to contain a film supply reel with a trailing end of a film secured thereto, and a film take-up core with the leading end of the film secured thereto, and take-up core being separable from the cartridge along with the film leading end, said cartridge having open and closed positions and, comprising: a housing comprised of two half sections pivotally coupled at ends thereof, one section having an opening therein, said other section being provided on an inner surface, at a portion corresponding in position to said opening in said one section, with a support, said support being adapted for supporting said reel so that at least a portion of a spindle hole of said reel appears in said opening, at least one of said two sections having a recess for detachably retaining said take-up core, and a movable member, said movable member extending between free ends of said two sections, said movable member and said two sections having cooperating means thereon for maintaining said cartridge in a closed position, said movable member being separable from at least one of said sections to permit opening of said cartridge, said movable member covering said recess to retain said take-up core therein and being movable to uncover said recess for removal of said take-up core from said recess.

2. In a film cartridge as claimed in claim 1, said cartridge housing being made from two half sections molded as a unit.

3. In a film cartridge as claimed in claim 1, said recess being provided at a corner portion of said at least one of said half sections for detachably retaining an axle of said take-up core.

4. In a film cartridge as claimed in claim 3, said at least one of said half sections provided with said recess having a depression formed in the outer surface thereof surrounding said recess.

5. In a film cartridge as claimed in claim 1, said half sections being formed at the ends remote from their connected portion with grooves in which said movable member is guided therealong when the cartridge is in the closed position.

6. A film cartridge as claimed in claim 5, wherein one of said half sections is provided at a portion of said end with a reverse L-shaped wall (11) and the other of said half sections is provided with a notch (12), the top of said wall being housed in said notch when said cartridge is in the closed condition, and said movable member (4) is provided at one end with a projection (7) arranged to be engageable with said wall to thereby restrict the movement of said movable member.

7. A film cartridge as claimed in claim 6, wherein one of said grooves is provided in said L-shaped wall which is so arranged as to be in alignment with at least one groove formed in the half section with the notch (12) when said cartridge is in the closed position.

8. In a film cartridge as claimed in claim 6, wherein the cooperating means of said movable member (4) includes a notch (6) on the same side as said projection (7), and a projection (15) on the half section including said notch (12) which notch when said cartridge is in the closed condition can receive said projection (15) wherein said cartridge in the closed position is prevented from being opened without moving said movable member (4), said movable member (4) in said groove (9, 10) being allowed to move between a position in which said projection (7) on said movable member (4) engages said wall and a position in which said notch (6) in said movable member (4) receives said projection (15) on said half section with said notch (12).

9. In a film cartridge as claimed in claim 3, one of said half sections being provided on the outer surface with a groove (20).

* * * * *